(12) United States Patent
Hanahara et al.

(10) Patent No.: US 11,812,183 B2
(45) Date of Patent: Nov. 7, 2023

(54) INFORMATION PROCESSING DEVICE AND PROGRAM

(71) Applicant: SHISEIDO COMPANY, LTD., Tokyo (JP)

(72) Inventors: Masaki Hanahara, Tokyo (JP); Hironobu Yoshikawa, Tokyo (JP); Nodoka Takahashi, Tokyo (JP); Masato Kosukegawa, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 210 days.

(21) Appl. No.: 16/484,633

(22) PCT Filed: Mar. 9, 2017

(86) PCT No.: PCT/JP2017/009500
§ 371 (c)(1),
(2) Date: Sep. 25, 2019

(87) PCT Pub. No.: WO2018/163356
PCT Pub. Date: Sep. 13, 2018

(65) Prior Publication Data
US 2020/0169674 A1   May 28, 2020

(51) Int. Cl.
*H04N 5/272* (2006.01)
*H04N 7/14* (2006.01)
*H04N 23/72* (2023.01)

(52) U.S. Cl.
CPC ............. *H04N 5/272* (2013.01); *H04N 7/141* (2013.01); *H04N 23/72* (2023.01); *H04N 2005/2726* (2013.01)

(58) Field of Classification Search
CPC ...... H04N 5/272; H04N 5/2352; H04N 7/141; H04N 2005/2726

(Continued)

(56) References Cited

U.S. PATENT DOCUMENTS 9,603,437 B2   3/2017  Nguyen et al.
9,996,981 B1 *  6/2018  Tran ..................... G06V 40/103
(Continued)

FOREIGN PATENT DOCUMENTS

JP   2004-094917 A   3/2004
JP   2009-200900 A   9/2009
(Continued)

OTHER PUBLICATIONS

International Search Report (with partial translation) and Written Opinion dated Jun. 13, 2017, issued in corresponding International Patent Application No. PCT/JP2017/009500.

*Primary Examiner* — Joseph G Ustaris
*Assistant Examiner* — Jimmy S Lee
(74) *Attorney, Agent, or Firm* — Morgan, Lewis & Bockius LLP

(57) ABSTRACT

To promote a utilization of a moving image in a video call. An information processing apparatus includes: a correction module configured to correct the luminance of a first video data acquired by a camera; a recognition module configured to recognize a first moving image and a second moving image in a first video data whose luminance is corrected, the first moving image including at least a part of a user's face, the second moving image not including a face; a correction module configured to correct a recognized second moving image; a generation module configured to generate a second video data including a first moving image included in a first video data whose luminance is corrected and a corrected second moving image; and a providing module configured to provide a second video data to a video call application.

12 Claims, 14 Drawing Sheets

(58) Field of Classification Search
USPC .................................................... 348/14.03
See application file for complete search history.

(56) References Cited

U.S. PATENT DOCUMENTS

| | | | | |
|---|---|---|---|---|
| 11,244,159 | B2* | 2/2022 | Chihara | G06V 10/751 |
| 2008/0300010 | A1* | 12/2008 | Border | H04N 23/6811 |
| | | | | 348/E5.046 |
| 2010/0149368 | A1* | 6/2010 | Yamashita | H04N 23/68 |
| | | | | 348/222.1 |
| 2011/0007823 | A1* | 1/2011 | Matsuo | H04N 5/772 |
| | | | | 375/240.26 |
| 2012/0306991 | A1* | 12/2012 | DeGrazia | H04N 7/15 |
| | | | | 348/E7.083 |
| 2013/0342633 | A1* | 12/2013 | Ikeda | H04N 7/147 |
| | | | | 348/14.02 |
| 2016/0316125 | A1* | 10/2016 | Urakami | H04N 23/71 |

FOREIGN PATENT DOCUMENTS

| | | |
|---|---|---|
| JP | 2010-529735 A | 8/2010 |
| JP | 2014-075779 A | 4/2014 |
| KR | 10-2012-0090870 D1 | 8/2012 |
| WO | 2008/153728 A2 | 12/2008 |

\* cited by examiner

[FIG. 1]
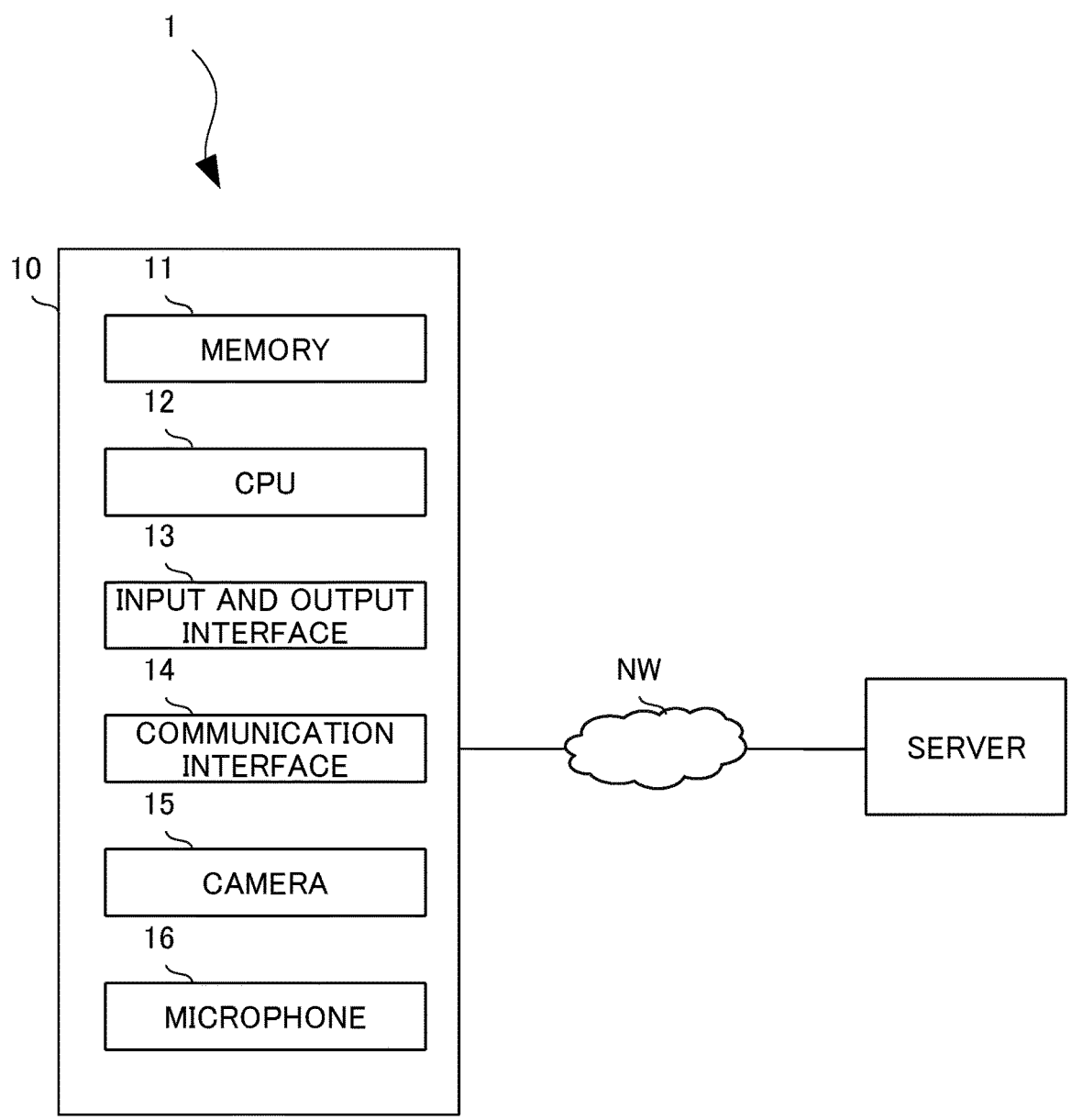

[FIG. 2]
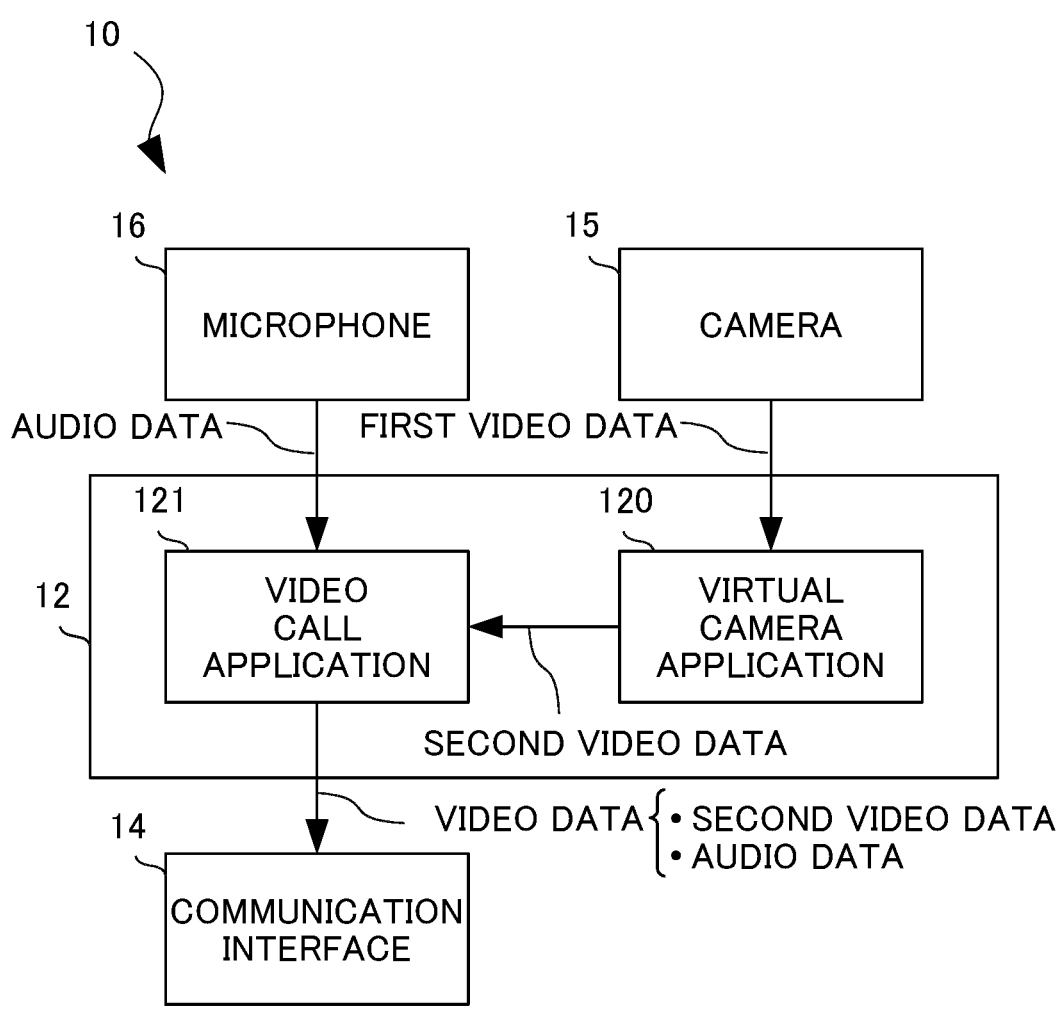

[FIG. 3]

MAKEUP PATTERN DATABASE

| PATTERN ID | PATTERN NAME | CORRECTION PARAMETER | | | | | |
| --- | --- | --- | --- | --- | --- | --- | --- |
| | | LIP CP1 | EYELID CP2 | EYE CP3 | EYELASH CP4 | CHEEK CP5 | BACKGROUND CP6 |
| MP001 | MP1 | 20 | 100 | 80 | 60 | 20 | |
| MP002 | MP2 | 100 | 20 | 20 | 20 | 60 | |
| MP003 | MP3 | 40 | 60 | 40 | 60 | 40 | |
| MP004 | MP4 | 60 | 40 | 60 | 40 | 60 | |
| MP005 | ORIGINAL | 80 | 80 | 80 | 80 | 80 | 50 |

[FIG. 4]
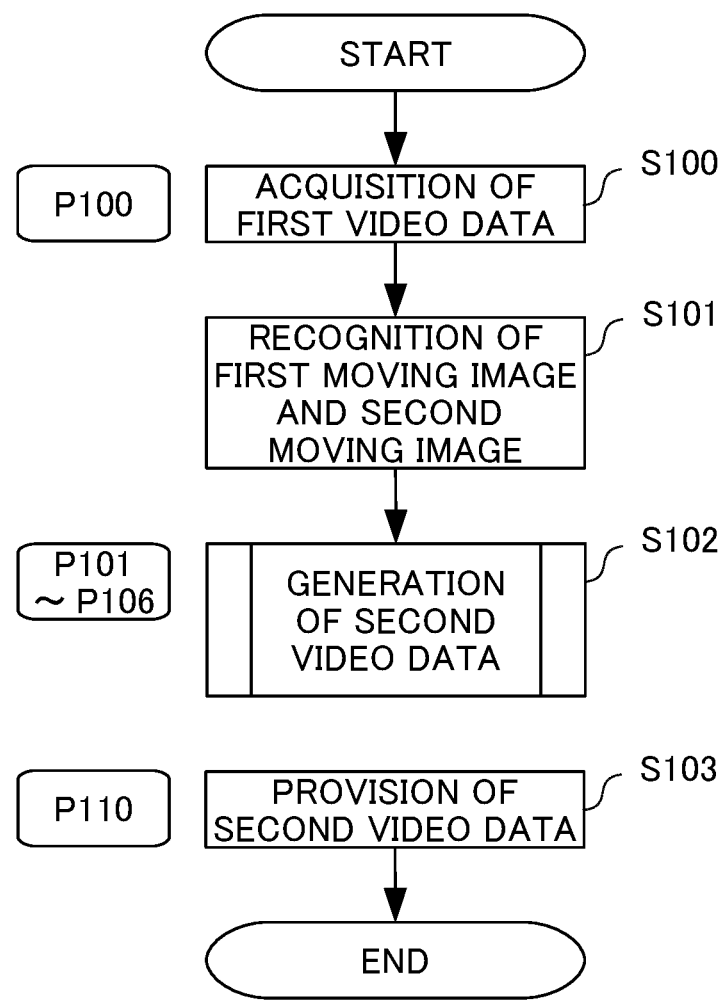

[FIG. 5]
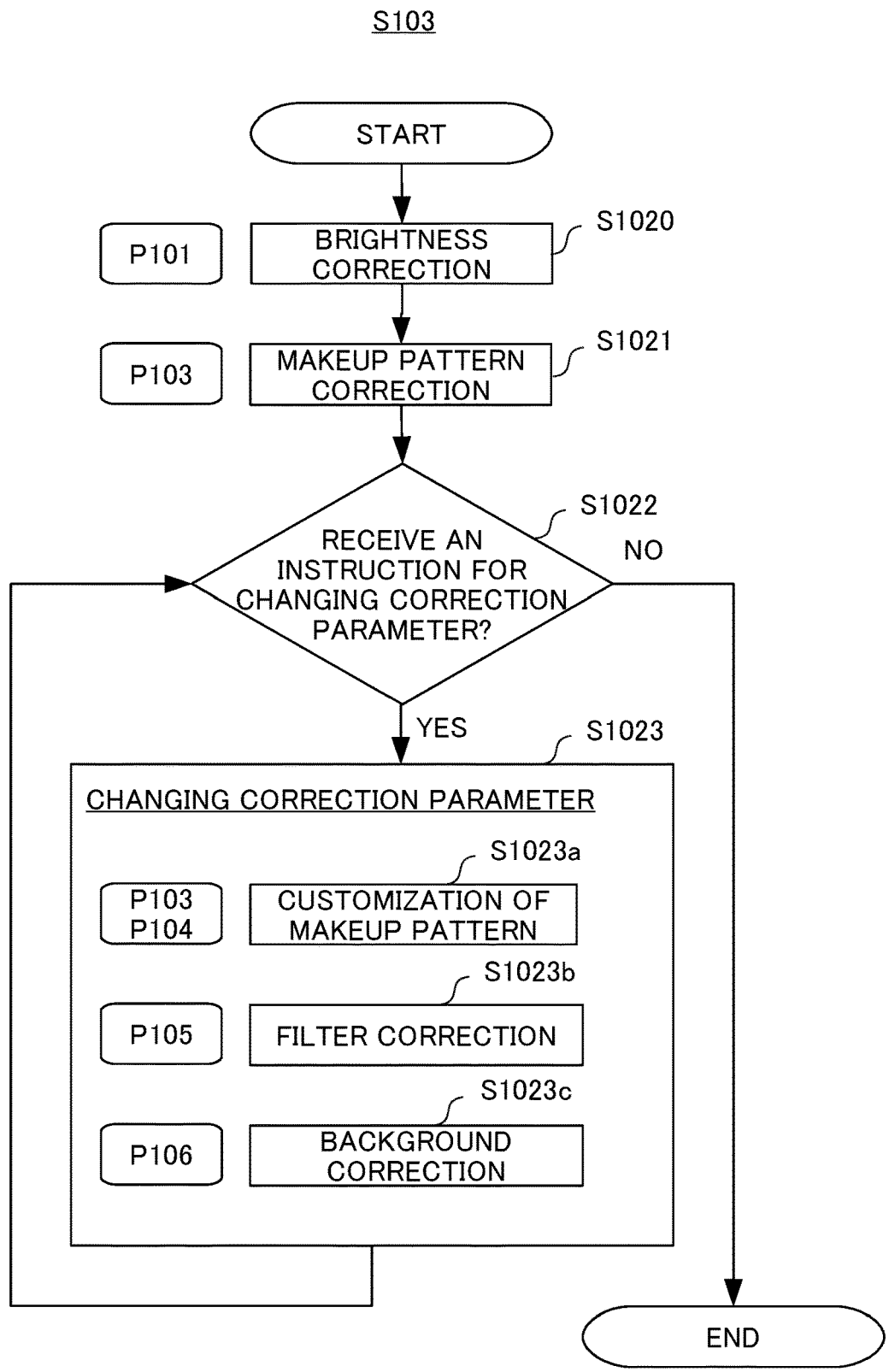

[FIG. 6]

[FIG. 7]
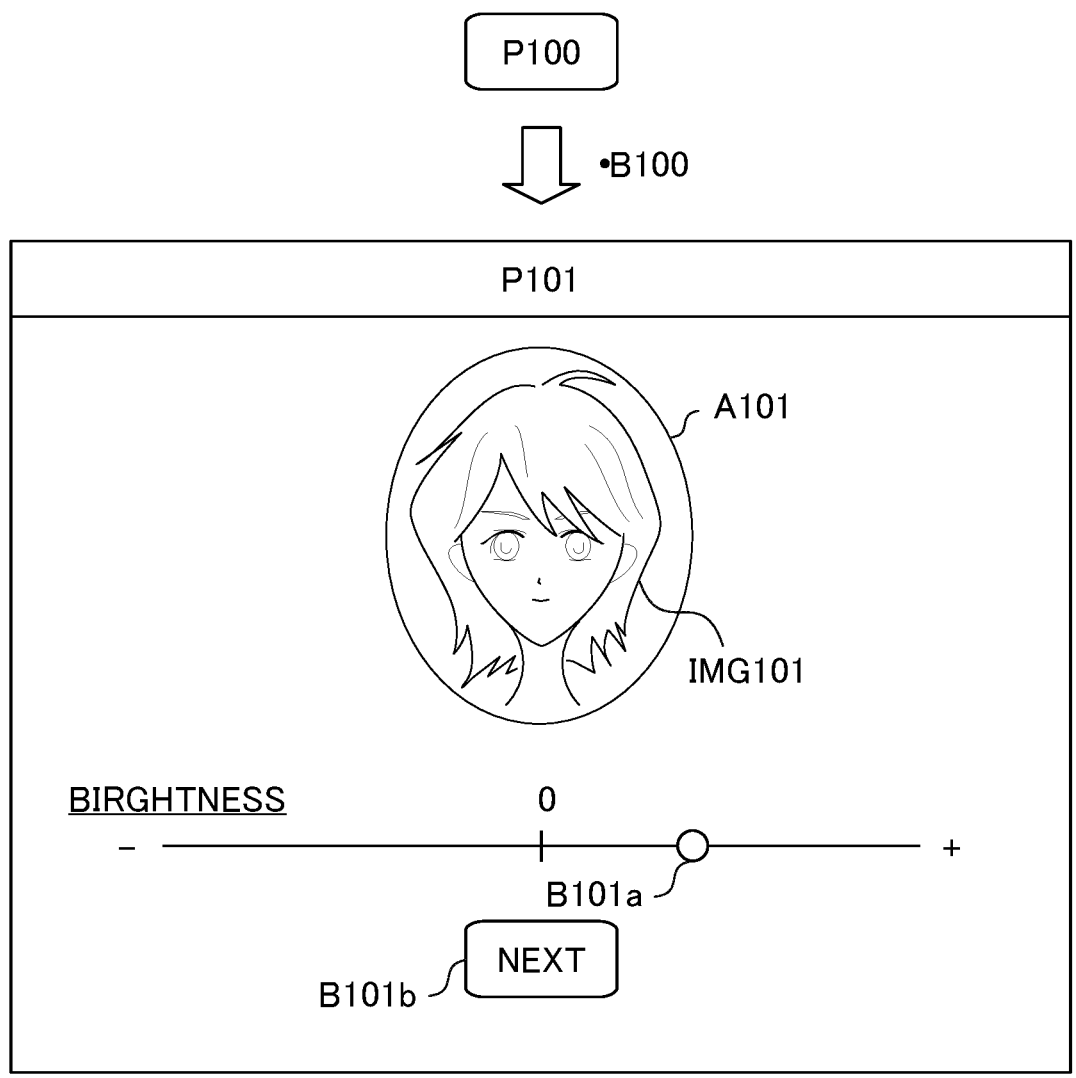

[FIG. 8]
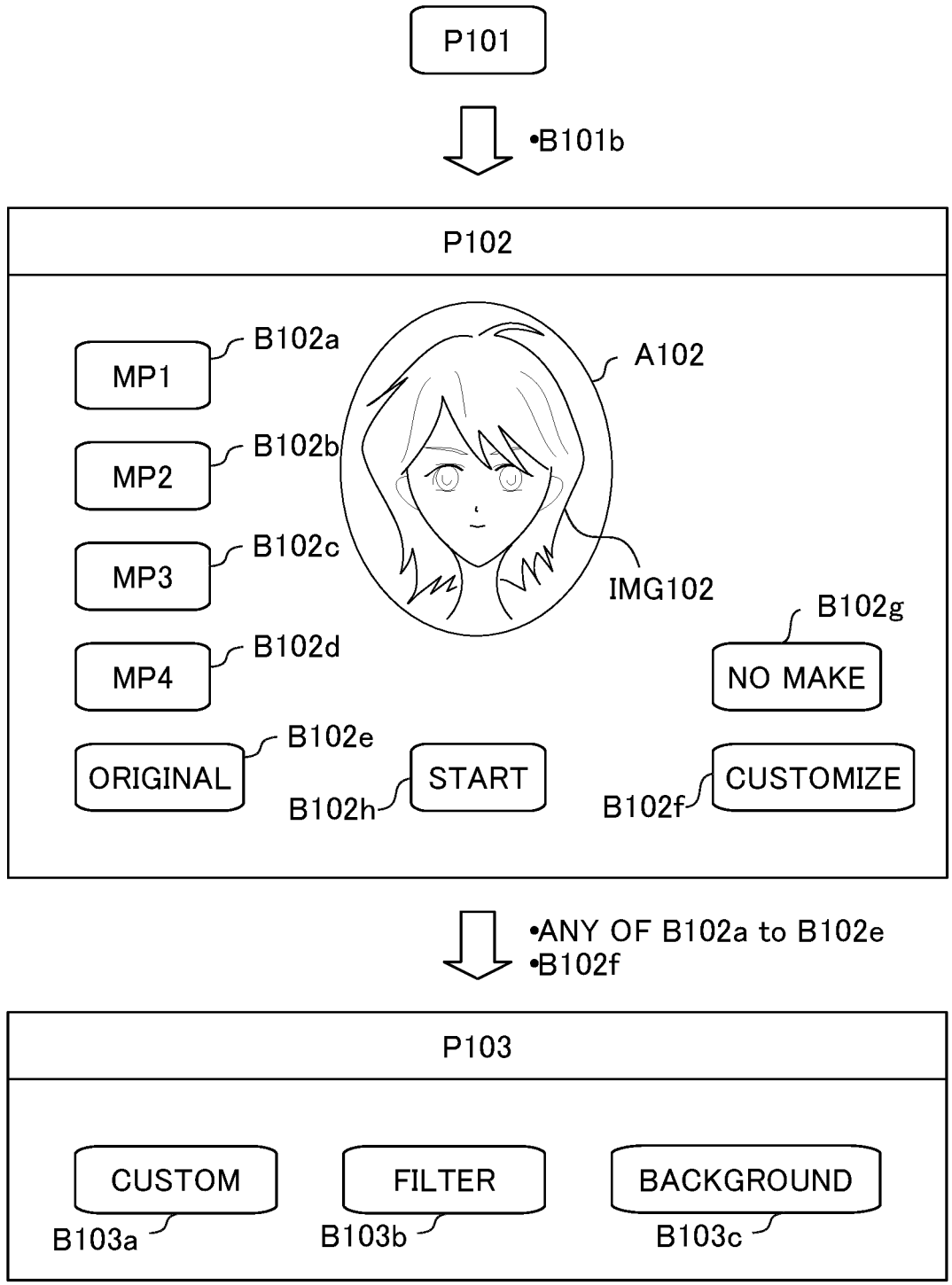

[FIG. 9]
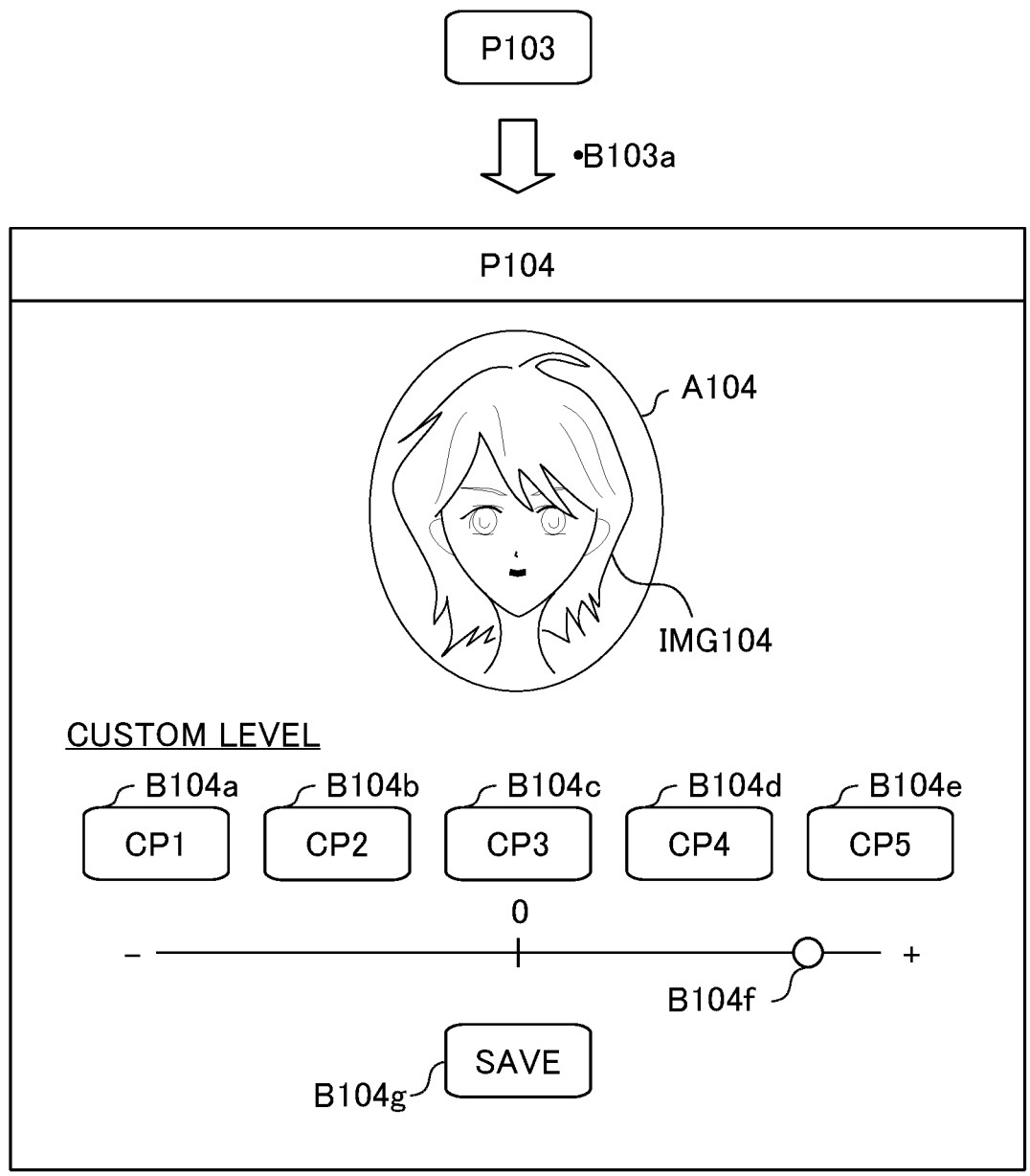

[FIG. 10]
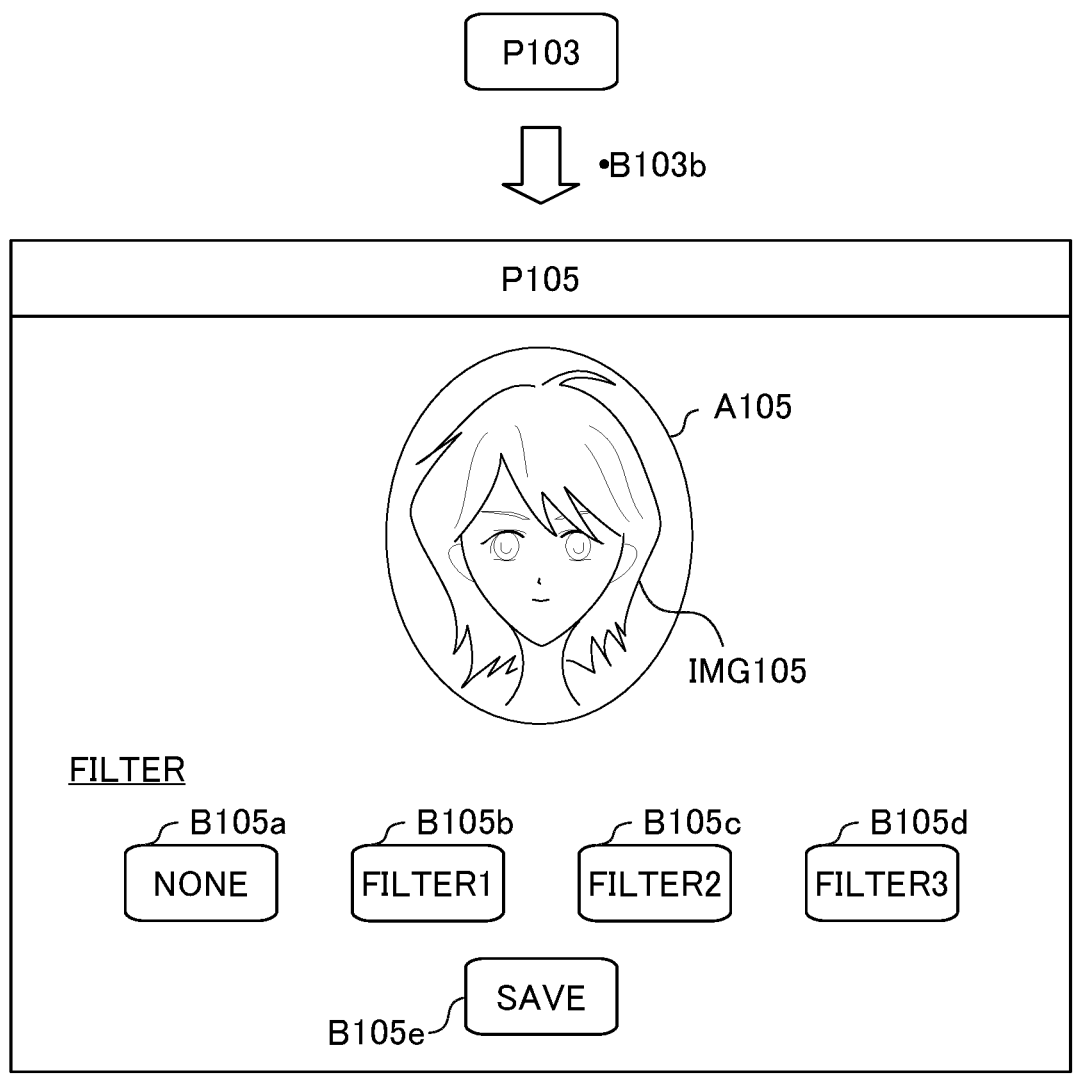

[FIG. 11]
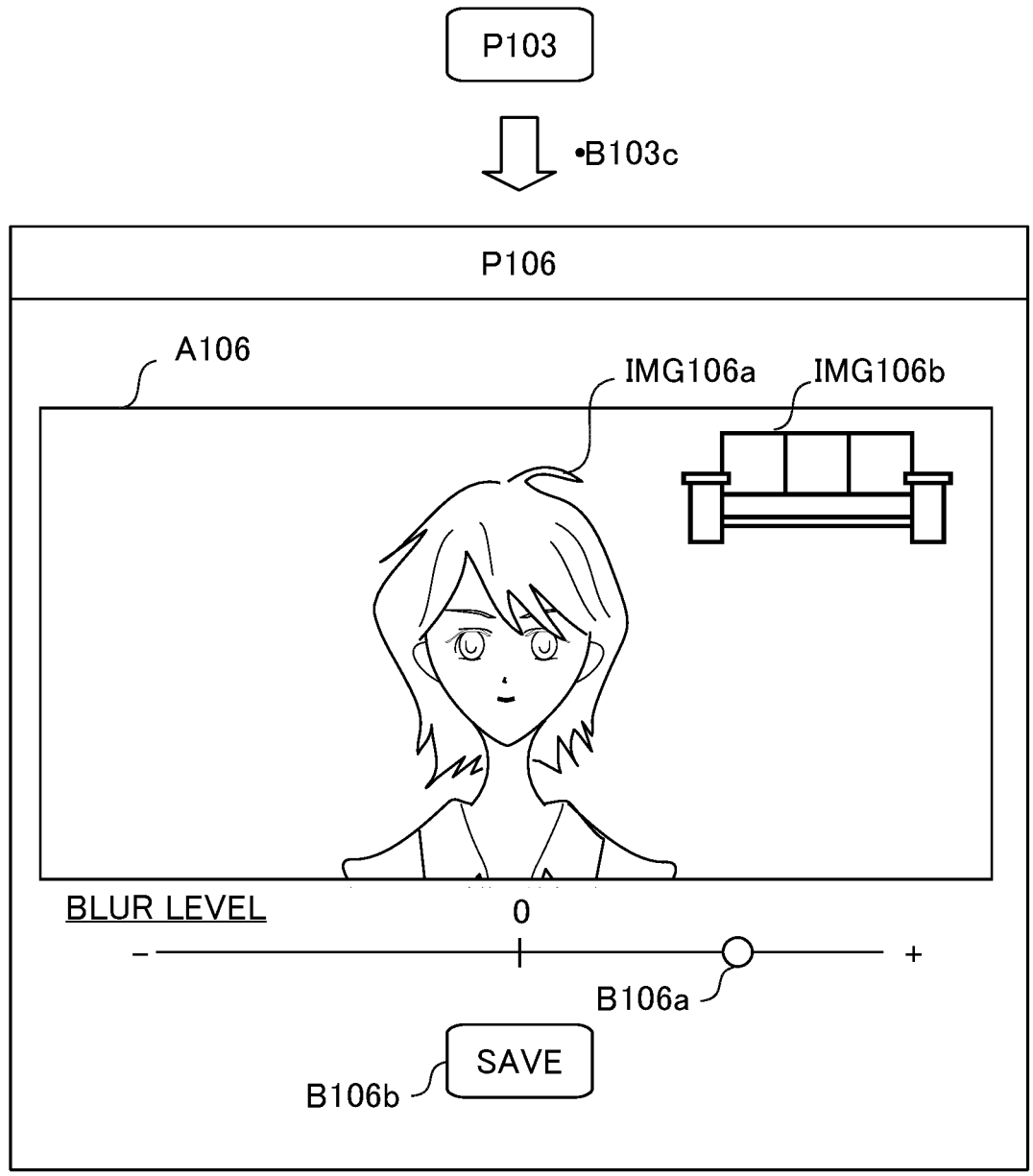

[FIG. 12]
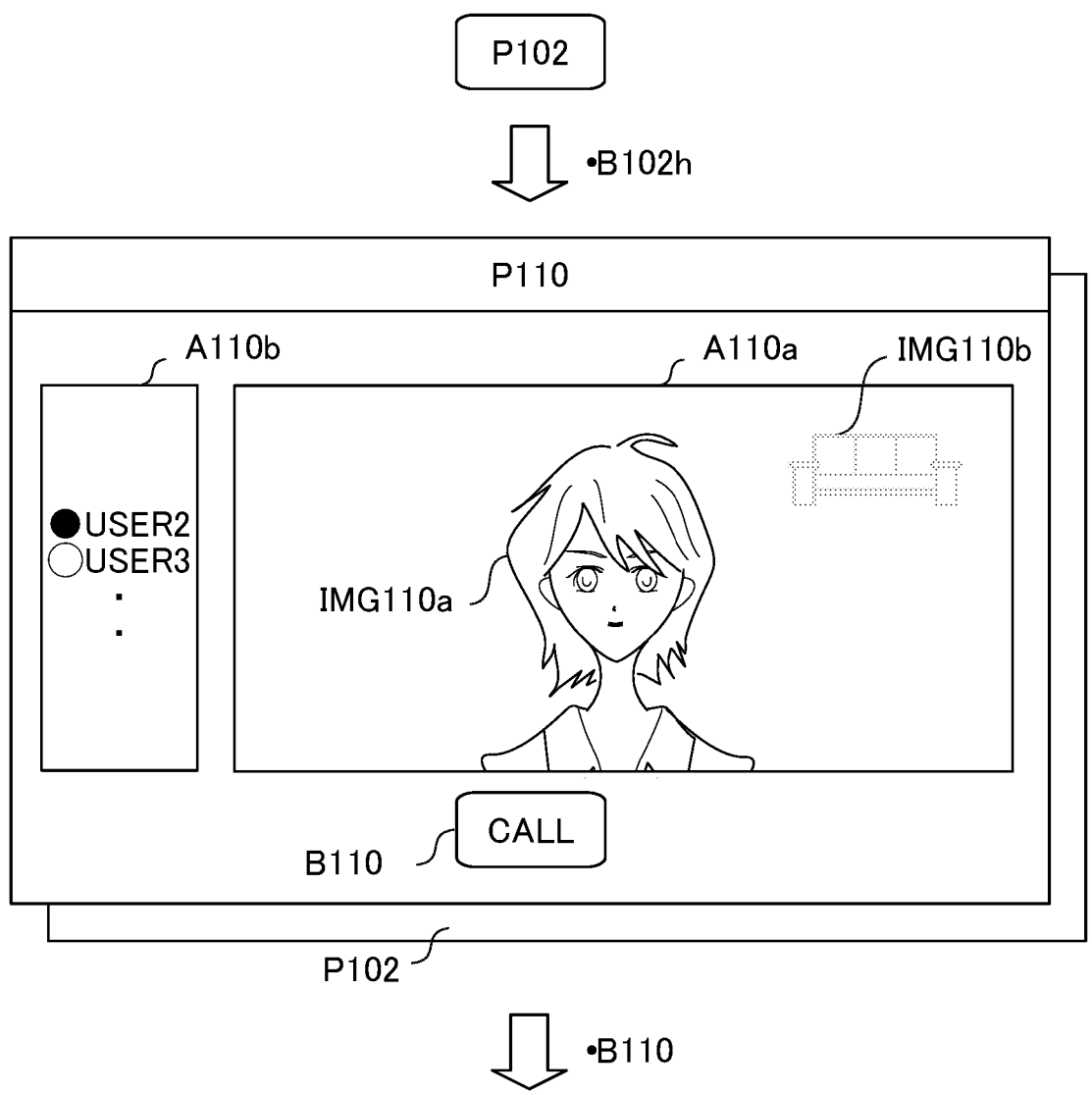

[FIG. 13]

MAKEUP PATTERN DATABASE

| | | CORRECTION PARAMETER | | | | | |
|---|---|---|---|---|---|---|---|
| | | LIP | EYELID | EYE | EYELASH | CHEEK | BACKGROUND |
| USER ID | USER NAME | CP1 | CP2 | CP3 | CP4 | CP5 | CP6 |
| U001 | USER1 | 80 | 80 | 80 | 80 | 80 | 50 |
| U002 | USER2 | 100 | 20 | 20 | 20 | 60 | 30 |
| U003 | USER3 | 40 | 60 | 40 | 60 | 40 | 80 |

[FIG. 14]
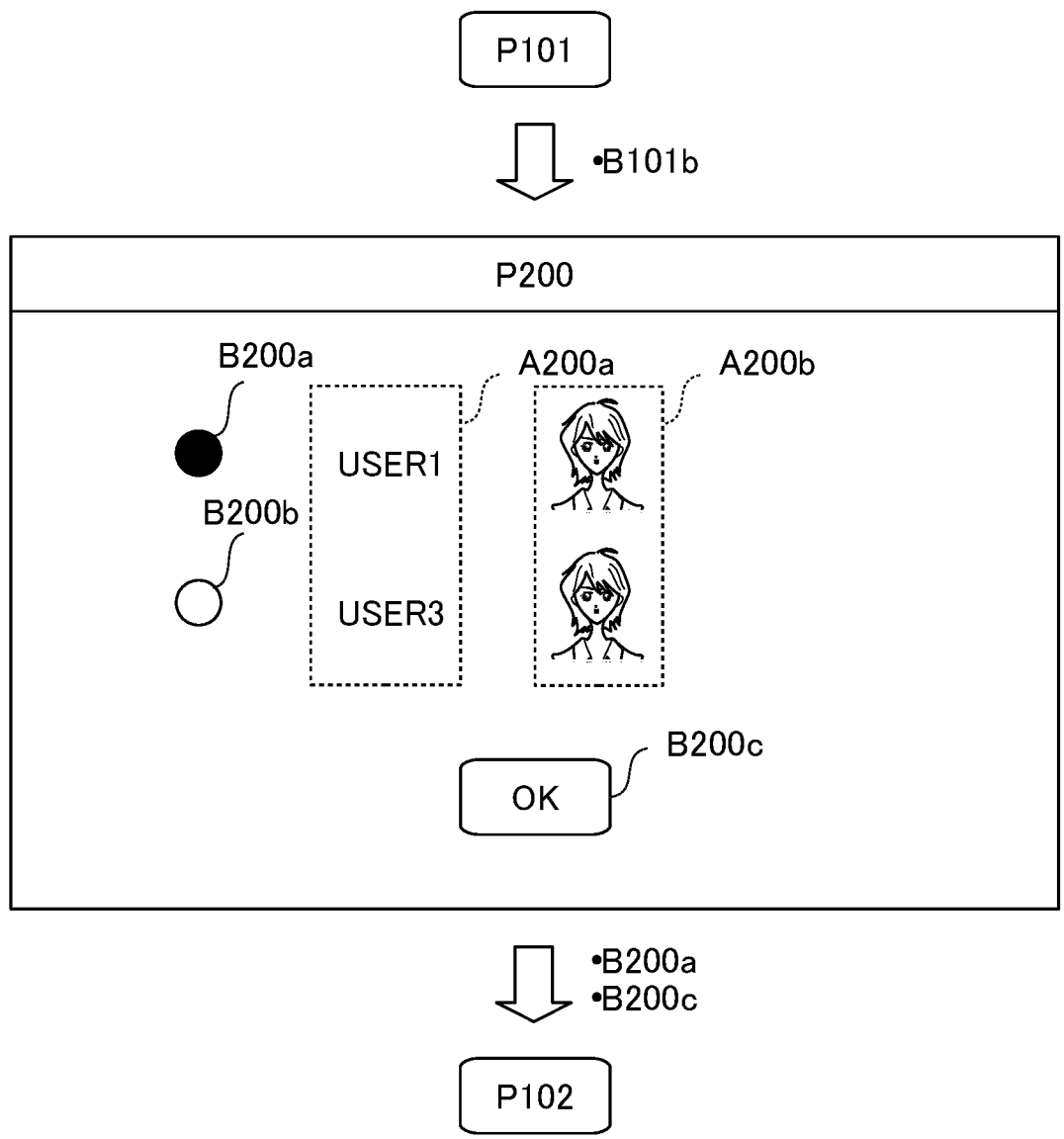

INFORMATION PROCESSING DEVICE AND PROGRAM

TECHNICAL FIELD

The present invention relates to an information processing apparatus and a program.

BACKGROUND ART

In recent years, the frequency of use of video calls has increased. A user of the video call can improve the quality of communication by providing his/her moving image to the opposite party user.

Conventionally, techniques for processing moving images used in video calls are known. For example, Patent Document 1 discloses a technique for providing a moving image of a user in a format desired by an opposite party user.

PRIOR ART DOCUMENTS

Patent Documents

[Patent Document 1] Japanese Patent Application Publication No. 2014-075779

SUMMARY OF INVENTION

Technical Problem

The user may hesitate to provide his/her moving image (for example, an image of a face and an image of a background). For example, female users tend to participate in video calls with only audio, without providing their own moving images.

However, according to Patent Document 1, the opposite party user arbitrarily determines the moving image to be provided to the opposite party user. That is, the user can not determine the moving image to be provided to the opposite party user by himself/herself. Therefore, the user's hesitation in providing the moving image can not be removed.

The purpose of the present invention is to promote a utilization of a moving image in a video call.

Solution to Problem

One aspect of the present invention is
an information processing apparatus comprising:
a correction module configured to correct the luminance of a first video data acquired by a camera;
a recognition module configured to recognize a first moving image and a second moving image in the first video data whose luminance is corrected, the first moving image including at least a part of a user's face, the second moving image not including the face;
a correction module configured to correct the recognized second moving image;
a generation module configured to generate a second video data including the first moving image included in the first video data whose luminance is corrected and the corrected second moving image; and
a providing module configured to provide the second video data to a video call application.

Advantageous Effects of Invention

According to the present invention, it is possible to promote a utilization of a moving image in a video call.

BRIEF DESCRIPTION OF DRAWINGS

FIG. 1 is a block diagram showing the configuration of an information processing system according to an embodiment of the present invention.

FIG. 2 is a diagram showing a function of an application installed in the client terminal in FIG. 1.

FIG. 3 is a diagram showing a data structure of a makeup pattern database of the present embodiment.

FIG. 4 is a flowchart of the information processing of the present embodiment.

FIG. 5 is a detailed flowchart of generation of the second video data in FIG. 4.

FIG. 7 is a diagram showing an example of a screen displayed in the information processing of the present embodiment.

FIG. 8 is a diagram showing an example of a screen displayed in the information processing of the present embodiment.

FIG. 9 is a diagram showing an example of a screen displayed in the information processing of the present embodiment.

FIG. 10 is a diagram showing an example of a screen displayed in the information processing of the present embodiment.

FIG. 11 is a diagram showing an example of a screen displayed in the information processing of the present embodiment.

FIG. 12 is a diagram showing an example of a screen displayed in the information processing of the present embodiment.

FIG. 13 is a diagram showing a data structure of a makeup pattern database of Variation 3.

FIG. 14 is a diagram showing an example of a screen displayed in the information processing of Variation 3.

DESCRIPTION OF EMBODIMENTS

Figure 6A:
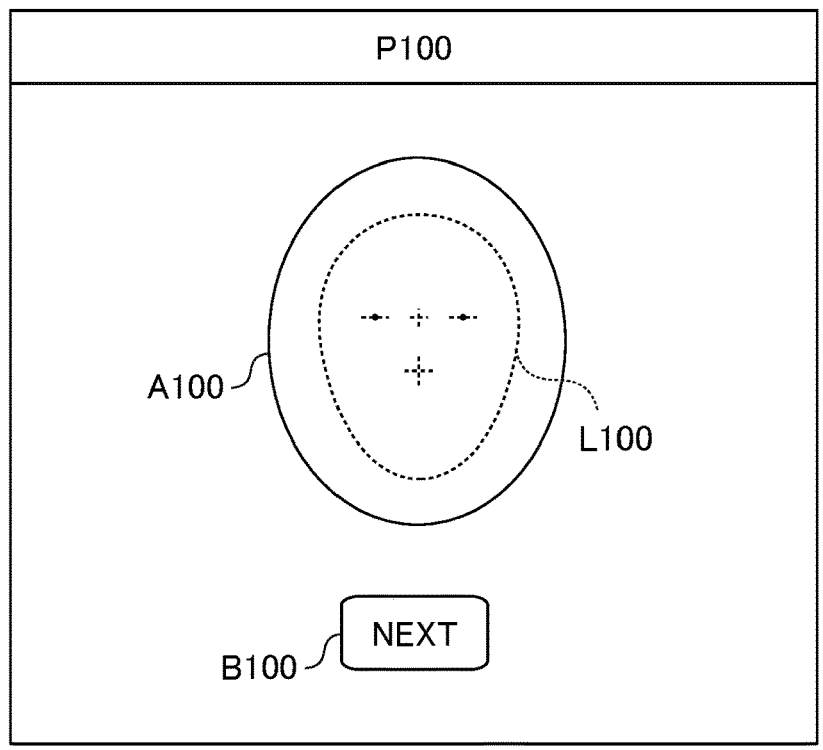
FIG. 6 is a diagram showing an example of a screen displayed in the information processing of the present embodiment.
Figure 6B:
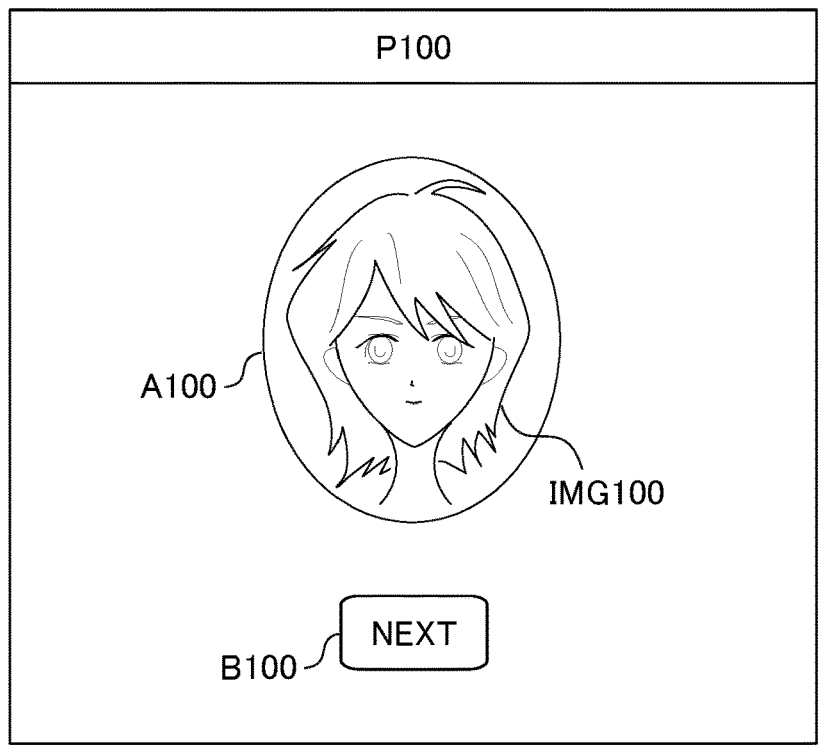

Hereinafter, an embodiment of the present invention is described in detail based on the drawings. Note that, in the drawings for describing the embodiments, the same components are denoted by the same reference sign in principle, and the repetitive description thereof is omitted.

(1) Configuration of Information Processing System

The configuration of the information processing system is described. FIG. 1 is a block diagram showing the configuration of the information processing system according to the present embodiment.

As shown in FIG. 1, an information processing system 1 includes a client terminal 10 and a server 30.

The client terminal 10 and the server 30 are connected via a network (for example, the Internet or an intranet) NW.

The client terminal 10 is an example of an information processing apparatus that transmits a request to the server 30. The client terminal 10 is, for example, a smartphone, a tablet terminal, or a personal computer.

The server 30 is an example of an information processing apparatus that transmits a response corresponding to a request to the client terminal 10. The server 30 is, for example, a web server.

(1-1) Configuration of Client Terminal

The configuration of the client terminal 10 is described with reference to FIG. 1.

As shown in FIG. 1, the client terminal 10 compresses a memory 11, a CPU (Central Processing Unit) 12, an input and output interface 13, a communication interface 14, a camera 15, and a microphone 16.

The memory 11 is configured to store a program and data. The memory 11 is, for example, a combination of a ROM (read only memory), a RAM (random access memory), and a storage (for example, a flash memory or a hard disk).

The program is, for example, a program of an OS (operating system) or a program of an application that executes an information processing. As shown in FIG. 2, the application includes a virtual camera application 120 and a video call application 121.

The data includes, for example, the following data:
Data referenced in an information processing;
An image processing library (for example, an image recognition algorithm for recognizing a specific part in an image based on a feature amount of the image, a luminance correction parameter for optimizing the luminance of an image, and an image processing filter to be applied to an image); and
Data obtained by executing an information processing (that is, an execution result of an information processing).

The CPU 12 in FIG. 1 is configured to realize a function of the client terminal 10 by executing a program stored in the memory 11. The CPU 12 is an example of a computer.

The input and output interface 13 is configured to receive a user's instruction from an input device connected to the client terminal 10 and to output information to an output device connected to the client terminal 10.

The input device is, for example, a keyboard, a pointing device, a touch panel, or a combination thereof.

The output device is, for example, a display.

The communication interface 14 is configured to control communication between the client terminal 10 and the server 30.

The camera 15 is configured to acquire video data. The camera 15 captures a moving image (hereinafter referred to as a "first moving image") of at least a part of a face of a user of the client terminal 10 to acquire video data (hereinafter referred to as a "first video data") including the first moving image.

The microphone 16 is configured to acquire audio data.

(1-2) Function of Application

A function of an application of the client terminal 10 is described. FIG. 2 is a diagram showing a function of an application installed in the client terminal in FIG. 1.

As shown in FIG. 2, the CPU 12 is a processor that realizes a function of the virtual camera application 120 and a function of the video call application 121.

The virtual camera application 120 is configured to generate a second video data by correcting the first video data, and to provide the second video data to the video call application 121. The function of the virtual camera application 120 may be a function independent of the function of the video call application 121 or may be a part of the function of the video call application 121.

The video call application 121 is configured to transmit video data to the server 30 via the communication interface 14. The video data includes the second video data and an audio data.

The server 30 is configured to control a video call sequence. In the video call sequence, video data is shared among a plurality of client terminals 10.

(2) Database

The database of the present embodiment is described. FIG. 3 is a diagram showing a data structure of a makeup pattern database of the present embodiment.

As shown in FIG. 3, the makeup pattern database includes a "PATTERN ID" field, a "PATTERN NAME" field, and a "CORRECTION PARAMETER" field. Each field is associated with each other.

The "CORRECTION PARAMETER" field includes correction parameters, each of which is for correcting an image of each part of a face, and a correction parameter for correcting an image of a background. Specifically, the "CORRECTION PARAMETER" field includes a "LIP" field, an "EYELID" field, an "EYE" field, an "EYELASH" field, a "CHEEK" field, and a "BACKGROUND" field. Correction parameter IDs "CP1" to "CP6" are associated with each field. The correction parameter ID is information for identifying the correction parameter.

The makeup pattern database is stored in the memory 11.

The "PATTERN ID" field stores a pattern ID. The pattern ID is information for identifying a makeup pattern. The makeup pattern is a combination of correction parameters, each of which is for correcting an image of each part of a user's face.

The "PATTERN NAME" field stores information (for example, text) indicating a name of the makeup pattern.

The "CORRECTION PARAMETER" field stores the correction parameters. Specifically, the "LIP" field stores a correction parameter for correcting a lip image (for example, at least one of lipstick thickness, glossiness, gloss level, and pearliness).

The "EYELID" field stores a correction parameter for correcting an eyelid image (for example, at least one of eye shadow thickness, glossiness, gloss level, and pearliness).

The "EYE" field stores a correction parameter for correcting an eye image (for example, eye shape).

The "EYELASH" field stores a correction parameter for correcting an eyelash image (for example, mascara thickness).

The "CHEEK" field stores a correction parameter for correcting a cheek image (for example, blush thickness).

The higher the numerical value of each field, the higher the level (for example, density) of makeup applied to each part of the first moving image.

The "BACKGROUND" field stores a correction parameter for correcting the second moving image. The correction parameter for correcting the second moving image includes, for example, at least one of the following:
A correction parameter for correcting the blur level of the second moving image (for example, the higher the blur level, the lower the visibility of the second moving image (that is, the more difficult it is for the user to see));

A correction parameter for changing the color of the second moving image (for example, grayscale or a value indicating the level of transparency);

A correction parameter for applying mosaic processing to the second moving image (for example, a value indicating the level of mosaic processing); and A correction parameter for combining another image with the second moving image (for example, a value indicating the ratio of the image to be combined).

(3) Flow of Information Processing

The flow of the information processing of the present embodiment is described. FIG. 4 is a flowchart of the information processing of the present embodiment. FIG. 5 is a detailed flowchart of generation of the second video data in FIG. 4. Each of FIGS. 6 to 12 is a diagram showing an example of a screen displayed in the information processing of the present embodiment.

Each step in FIGS. 4 and 5 is a function of the virtual camera application 120 in FIG. 2.

As shown in FIG. 4, the client terminal 10 executes acquisition of the first video data (S100).

Specifically, when the user instructs activation of the virtual camera application 120, the CPU 12 executes a program of the virtual camera application 120 and displays a screen P100 (FIG. 6) on the display.

As shown in FIG. 6A, the screen P100 includes an area object A100 and a button object B100.

In the area object A100, a face line L100 (FIG. 6A) and an image IMG100 (FIG. 6B) are displayed. The image IMG100 is a preview image corresponding to a video data acquired by the camera 15.

The button object B100 is an object for receiving an instruction for acquisition of the first video data. When the user designates the button object B100 after aligning the facial contour of the user's face with the face line L100, the CPU 12 acquires, from the camera 15, the first video data corresponding to the image IMG100 (FIG. 6B) displayed in the area object A100.

As shown in FIG. 4, the client terminal 10 executes recognition of the first moving image and the second moving image (S101).

Specifically, the CPU 12 recognizes, by using the image recognition algorithm stored in the memory 11, the first moving image and the second moving image based on a feature amount of the first video data acquired in the step S100. The second moving image is a moving image other than the first moving image in the first video data. That is, the second moving image is a moving image not including the user's face (for example, a moving image including the background behide the user).

Next, the CPU 12 recognizes a part of the face included in the first moving image (for example, lip, eyelid, eye, cheek, nose, hairstyle, facial contour, eyebrow, eyelash) based on the feature amount of the first video data.

After the step S101, the client terminal 10 executes generation of the second video data (S102).

As shown in FIG. 5, the client terminal 10 executes brightness correction (S1020).

Specifically, the CPU 12 specifies the luminance of the image corresponding to a part of the face (for example, cheek) in the first moving image recognized in the step S101.

Next, the CPU 12 corrects the luminance of the first moving image and the second moving image (that is, the entire image of the first video data) so that the specified luminance is included in a predetermined range.

Next, the CPU 12 displays a screen P101 (FIG. 7) on the display.

As shown in FIG. 7, the screen P101 includes an area object A101 and button objects B101a and B101b.

The button object B101a is an object for receiving an instruction for changing the luminance of the first moving image. When the user moves the button object B101a to the "+" side or the "−" side, the CPU 12 changes the luminance of the first moving image to a value corresponding to the position of the button object B101a. The user can adjust the brightness of the entire image of the first video data by moving the button object B101a.

The button object B101b is an object for receiving an instruction for settling the luminance of the first moving image. When the user designates the button object B101b, the step S1020 ends.

In the area object A101, an image IMG101 is displayed. The image IMG101 is a preview image of the first moving image after the luminance is corrected.

When the user designates the button object B101b (FIG. 7), as shown in FIG. 5, the client terminal 10 executes makeup pattern correction (S1021).

Specifically, the CPU 12 displays a screen P102 (FIG. 8) on the display.

As shown in FIG. 8, the screen P102 includes an area object A102 and button objects B102a to B102h.

In the area object A102, an image IMG102 is displayed.

Button objects B102a to B102e are objects for receiving an instruction for a makeup pattern. The button objects B102a to B102e are assigned the pattern IDs "MP001" to "MP005" (FIG. 3), respectively. When the user designates any of the button objects B102a to B102e, the CPU 12 selects the makeup pattern identified by the pattern ID assigned to the button object designated by the user (that is, the combination of the correction parameters corresponding to the button designated by the user). Next, the CPU 12 generates the second video data by correcting the image of each part of the first moving image using the selected makeup pattern. The image IMG102 in this case is a preview image of the first moving image after the makeup correction.

The button object B102f is an object for receiving an instruction for changing the correction parameter (S1023).

The button object B102g is an object for receiving an instruction for canceling the makeup pattern correction. When the user designates the button object B102g, the CPU 12 cancels the makeup pattern correction. The image IMG102 in this case is the same as the preview image IMG101 (FIG. 7) of the first moving image.

The button object B102h is an object for receiving an instruction for activating the video call application 121. When the user designates the button object B102h, the CPU 12 executes a program of the video call application 121.

When the user designates the button object B102h (FIG. 8) (S1022—NO), the processing of FIG. 5 ends.

When the user designates any of the button objects B102a to B102e (FIG. 8) and the button object B102f (FIG. 8) (S1022—YES), as shown in FIG. 5, the client terminal 10 executes changing the correction parameter (S1023).

Specifically, the CPU 12 displays a screen P103 (FIG. 8) on the display.

As shown in FIG. 8, the screen P103 includes button objects B103a to B103c.

The button object B103a is an object for receiving an instruction for customization of the makeup pattern (S1023a).

The button object B103*b* is an object for receiving an instruction for filter correction (S1023*b*).

The button object B103*c* is an object for receiving an instruction for background correction (S1023*c*). When the user designates the button object B103*c*, the CPU 12 displays a screen P106 (FIG. 11) on the display.

When the user designates the button object B103*a* (FIG. 8), the CPU 12 executes customization of the makeup pattern (S1023*a*).

Specifically, the CPU 12 displays a screen P104 (FIG. 9) on the display.

As shown in FIG. 9, the screen P104 includes an area object A104 and button objects B104*a* to B104*g*.

In the area object A104, an image IMG104 is displayed. The image IMG104 is a preview image of the first moving image corresponding to the changed correction parameter.

Buttons B104*a* to B104*e* are objects for receiving an instruction for a correction parameter to be changed. The button objects B104*a* to B104*e* are assigned the correction parameter IDs "CP1" to "CP5" in FIG. 3, respectively. When the user designates any of the button objects B104*a* to B104*e*, the CPU 12 specifies the correction parameter to be changed. The correction parameter to be changed is the correction parameter identified by the correction parameter ID assigned to the button designated by the user.

The button object B104*f* is an object for receiving an instruction for the value of the changed correction parameter. When the user moves the button object B104*f* to the "+" side or the "−" side, the CPU 12 changes the correction parameter to be changed to a value corresponding to the position of the button object B104*f*. The user can adjust the correction parameter to be changed by moving the button object B104*f*.

The button object B104*g* is an object for receiving an instruction for saving the changed correction parameter. When the user designates the button object B104*g*, the CPU 12 stores the changed correction parameter in the memory 11.

As one example, when the user designates the button objects B102*a* and B103*a* (FIG. 8) and designates the button objects B104*a*, B104*f* and B104*g* (FIG. 9), the CPU 12 copies the value in each field associated with the pattern ID "MP001" to each field associated with pattern ID "MP005" in FIG. 3.

Next, the CPU 12 updates the "LIP" field associated with the pattern ID "MP005" using a value corresponding to the position of the button object B104*f*.

When the user designates the button object B103*b* (FIG. 8), as shown in FIG. 5, the client terminal 10 executes filter correction (S1023*b*).

Specifically, the CPU 12 displays a screen P105 (FIG. 10) on the display.

As shown in FIG. 10, the screen P105 includes an area object A105 and button objects B105*a* to B105*e*.

In the area object A105, an image IMG105 is displayed. The image IMG105 is a preview image of the first moving image after the filter correction.

The button object B105*a* is an object for receiving an instruction for canceling the filter correction. When the user designates the button object B105*a*, the CPU 12 does not execute the filter correction. The image IMG105 in this case is the same as the image IMG102 (FIG. 8).

Buttons B105*b* to B105*d* are objects for receiving an instruction for the image processing filter. The button objects B105*b* to B105*d* are assigned the image processing filters "FILETR1" to "FILTER3", respectively.

The image processing filter "FILETR1" includes a correction parameter for correcting the luminance, contrast, colorfulness, and color tone of the first moving image such that the contrast of the image corresponding to at least a part of the face (for example, cheek) is included in a predetermined range.

The image processing filter "FILETR2" includes a correction parameter for correcting the luminance, contrast, colorfulness, and color tone of the first moving image such that the colorfulness of the image corresponding to at least a part of the face (for example, cheek) is included in a predetermined range.

The image processing filter "FILETR3" includes a correction parameter for correcting the luminance, contrast, colorfulness, and color tone of the first moving image such that the color tone of the image corresponding to at least a part of the face (for example, cheek) is included in a predetermined range.

When the user designates any of the button objects B105*b* to B105*d*, the CPU 12 applies the image processing filter assigned to the button designated by the user to the first moving image. In this case, the image IMG105 is a preview image of the first moving image after the image processing filter is applied.

The button object B105*e* is an object for receiving an instruction for settling the filter correction. When the user designates the button object B105*e*, the CPU 12 stores the correction parameter after filter correction in each field associated with the pattern ID "MP005" (FIG. 3). Thereby, the makeup pattern after filter correction is saved.

As one example, when the user designates the button objects B102*a* and B103*b* (FIG. 8) and designates the button objects B105*b* and B105*e* (FIG. 10), the CPU 12 changes the value of each field associated with "MP005" by using the image processing filter assigned to the button object B105*b*.

As shown in FIG. 5, when the user designates the button object B103*c* (FIG. 8), the client terminal 10 executes background correction (S1023*c*).

Specifically, the CPU 12 displays a screen P106 (FIG. 11) on the display.

As shown in FIG. 11, the screen P106 includes an area object A106 and button objects B106*a* and B106*b*.

The button object B106*a* is an object for receiving an instruction for changing the blur level of the second moving image. When the user moves the button object B106*a* to the "+" side or the "−" side, the CPU 12 changes the blur level of the second moving image to a value corresponding to the position of the button object B106*a*. The user can blur the background by moving the button object B106*a*.

In the area object A106, images IMG106*a* and IMG106*b* are displayed.

The image IMG106*a* is a preview image of the first moving image. The image IMG106*a* does not change even if the button object B106*a* moves.

The image IMG106*b* is a preview image of the second moving image. In the image IMG106*b*, the blur level changes in accordance with the position of the button object B106*a*.

The button object B106*b* is an object for receiving an instruction for settling the blur level. When the user designates the button object B106*b*, the CPU 12 stores the blur level and the pattern ID "MP005" in the memory 11 in association with each other.

As one example, when the user designates the button objects B102*a* and B103*c* (FIG. 8) and designates the button objects B106*a* and B106*b* (FIG. 11), the CPU 12 updates the "BACKGROUND" field associated with the pattern ID "MP005" by using a value corresponding to the position of the button object B106a.

When the user designates the button object B102h (FIG. 8) (S1022—NO), the client terminal 10 executes provision of the second video data (S103) in FIG. 4.

Specifically, the CPU 12 executes a program of the video call application 121 and displays a screen P110 (FIG. 12) on the display.

As shown in FIG. 12, the screen P110 includes area objects A110a and A110b and a button object B110.

In the area object A110a, images IMG110a and IMG110b are displayed.

The image IMG110a is the first moving image obtained in the step S102 (FIG. 4).

The image IMG110b is the second moving image obtained in the step S102.

In the area object A110b, a user name of an opposite party user registered in advance in the video call application 121 is displayed. For example, when the user designates the opposite party user "USER1" and the button object B110, the CPU 12 transmits a video call request to the server 30 via the communication interface 14.

The button object B110 is an object for receiving an instruction of a request (hereinafter, referred to as "video call request") for starting a video call sequence. When the user designates the button object B110, CPU 12 transmits a video call request to server 30.

When the opposite party user responds to the video call request, the server 30 initiates the video call sequence. In the video call sequence, video data is transmitted and received between the client terminal 10 of the user and the client terminal of the opposite party user. The video data transmitted by the client terminal 10 includes the second video data corresponding to the preview image displayed in the area object A110a.

Between the start of the video call sequence and the end of the video call sequence, the virtual camera application 120 continues to provide the second video data to the video call application 121 by executing the processing shown in FIG. 3.

As one example, when the user moves the button object B101a (FIG. 7) during the video call, the brightness of the entire image of the second video data can be changed during the video call.

When the user designates any of the button objects B101a to B102e (FIG. 8) during the video call, the makeup pattern can be changed during the video call.

Note that, the steps S1020 to S1023 are in random order.

In case where the step S1020 is executed, the step S1021 can be omitted.

In case where the step S1021 is executed, the step S1020 can be omitted.

At least one of the steps S1023a to S1023c can be omitted.

(4) Variations

Variations of the present embodiment are described.

(4-1) Variation 1

Variation 1 is described.

In background correction (S1023c), the client terminal 10 of Variation 1 corrects the second moving image when a predetermined condition is satisfied regardless of presence or absence of a user's instruction.

As one example, when the ratio of the second moving image to the first moving image is equal to or more than a predetermined value (that is, the background is more than a predetermined size), the CPU 12 corrects the second moving image according to the ratio.

As another example, when the recognition rate of the first moving image is equal to or less than a predetermined value, the CPU 12 corrects the second moving image according to the recognition rate.

According to Variation 1, when it is not possible to provide an opposite party user with a face part of a moving image enough to improve the quality of communication, it is possible to blur the background part of the moving image. This makes it possible to avoid that only the background part of the moving image is provided to the opposite party user.

(4-2) Variation 2

Variation 2 is described.

The client terminal 10 of Variation 2 can selects a makeup pattern corresponding to information about the user (hereinafter referred to as "user information") instead of the makeup pattern designated by the user in makeup pattern correction (S1021).

As one example, the memory 11 stores user information. The user information is, for example, at least one of the following information:

Information about a user's profile (for example, user name, gender of the user, and occupation of the user);

Information about a user's video call history (for example, date and time of video call, profile of opposite party user of video call, purpose of video call (as one example, a conference, a lesson of a foreign language));

User's action log (for example, information about cosmetics or clothes used by the user, information about purchase history of cosmetics or clothes purchased by the user);

Information about the user's mental state (for example, stress level); and

Information indicating the feature amount of the part (for example, facial contour) of the face recognized in the step S101.

The pattern ID is associated with the user information.

The CPU 12 selects a makeup pattern identified by the pattern ID associated with the user information in makeup pattern correction (S1021).

According to Variation 2, it is possible to recommend a user a makeup pattern that is optimal for the user.

(4-3) Variation 3

Variation 3 is described.

In customization of the makeup pattern (S1023a) in FIG. 5, the client terminal 10 of Variation 3 stores a makeup pattern including the changed correction parameter in a memory of the server 30 instead of updating the makeup pattern database stored in the memory 11.

FIG. 13 is a diagram showing a data structure of a makeup pattern database of Variation 3. FIG. 14 is a diagram showing an example of a screen displayed in the information processing of Variation 3.

As shown in FIG. 13, the makeup pattern database includes a "USER ID" field, a "USER NAME" field, and a "CORRECTION PARAMETER" field. Each field is associated with each other. The "CORRECTION PARAMETER" field is the same as in FIG. 3.

The "USER ID" field stores a user ID. The user ID is information for identifying a user.

The "USER NAME" field stores information (for example, text) indicating a name of a user.

In customization of the makeup pattern (S1023a), a CPU 12a of a client terminal 10a used by a user (user name "USER1") transmits the makeup pattern including the changed correction parameter, the user ID "U001", and the user name "USER1" to the server 30.

The server 30 stores the makeup pattern, the user ID, and the user name, which are transmitted from the client terminal 10a, in association with each other.

In the step S1021 (FIG. 5), a CPU 12b of a client terminal 10b used by a user (user name "USER2") displays a screen P200 (FIG. 14) on a display.

As shown in FIG. 14, the screen P200 includes area objects A200a and A200b and button objects B200a to B200c.

In the area object A200a, the user name of the user who saved the makeup pattern in the server 30 is displayed.

In the area object A200b, a preview image of the first image of the user (user name "USER2") when the makeup pattern is applied is displayed.

The button objects B200a and B200b are objects for receiving an instruction from the user. The button objects B200a and B200b are assigned user IDs "U001" and "U003" for identifying the users who saved the makeup pattern in the server 30. When the user (user name "USER2") designates the button objects B200a and B200b, the CPU 12b selects the makeup pattern associated with the user ID assigned to the button designated by the user (user name "USER2").

As one example, when the user name ("USER 2") designates the button objects B200a and B200c (FIG. 14), the CPU 12b corrects the image of each part of the first moving image by using the makeup pattern associated with the user ID "U001" in FIG. 13, and thereby generates the second video data.

According to Variation 3, a user can use a makeup pattern customized by another user other than the user.

(4-4) Variation 4

Variation 4 is described.

A makeup pattern of Variation 4 includes a correction parameter for correcting at least one of the following parts, in addition to the correction parameter of FIG. 3:
Hairstyle;
Facial contour;
Shape of eyebrow;
Shape of eyelash;
Shape of nose;
Shape of lip; and
Thickness of foundation.

(4-5) Variation 5

Variation 5 is described.

In a case where the recognition of the first moving image is failed in the step S101, the client terminal 10 of Variation 5 avoids to provide the first moving image (that is, an image of the face to which makeup is not performed) included in the first video data to the opposite party user. The case where the recognition is failed is, for example, the case where the recognition rate of the first moving image is equal to or less than a predetermined threshold.

As one example, when the recognition of the first moving image is failed in the step S101, the CPU 12 does not execute the steps S102 and S103.

Thereby, when the recognition of the first moving image is failed, the second video data is not provided to the client terminal 10 of the opposite party user. In this case, the display of the client terminal 10 of the opposite party user is blacked out.

As another example, when the recognition of the first moving image is failed in the step S101, the CPU 12 does not execute the step S102, and provides, in the step S103, the second video data generated when the recognition of the first moving image is succeeded.

Thereby, when the recognition of the first moving image is failed, the image of the face when the recognition of the first moving image is succeeded is displayed on the display of the client terminal 10 of the opposite party user like a still image.

As another example, when the recognition of the first moving image is failed in the step S101, the CPU 12 changes, for the first moving image and the second moving image (that is, the entire image of the first video data), at least one of the following correction parameter so as to reduce the visibility of the entire image of the first video data in the step S102:
A correction parameter for correcting the blur level;
A correction parameter for changing the color (for example, conversion to grayscale or a value indicating the level of transparency);
A correction parameter for applying mosaic processing (for example, a value indicating the level of mosaic processing); and
A correction parameter for combining another image (for example, a value indicating the ratio of the image to be combined).

Thereby, when the recognition of the first moving image is failed, an image with low visibility of at least the first moving image (for example, in case where a correction parameter for correcting the blur level is changed, an image in which the whole of the first video data is blurred) is displayed on the display of the client terminal 10 of the opposite party user.

According to Variation 5, when the recognition of the first moving image is failed in the step S101, it is possible to prevent an image of a face to which makeup is not performed from being provided to the opposite party user.

(4-6) Variation 6

Variation 6 is described. Variation 6 is an example in which the luminance of at least a part of the first moving image recognized in the step S101 is corrected in the step S1020.

As one example, the CPU 12 specifies the luminance of an image corresponding to a part of the face (for example, cheek) in the first moving image recognized in the step S101.

Next, the CPU 12 corrects the luminance of the whole of the first moving image or the specified luminance so that the specified luminance is included in a predetermined range.

(4-7) Variation 7

Variation 7 is described. Variation 7 is an example in which the virtual camera application 120 changes a setting value of the camera 15.

As one example, after the CPU 12 of Variation 7 specifies the luminance of a pixel corresponding to a part of the face (for example, cheek) in the step S1020 of FIG. 5, the CPU 12 changes a setting value of the camera 15 so that the specified luminance is included in a predetermined range.

As another example, when the user designates the button object B105*b* (FIG. 10) in the step S1023*b*, the CPU 12 changes a setting value of the camera 15 based on the correction parameter included in the image processing filter "FILTER1" assigned to the button object B105*b*.

According to Variation 7, the camera 15 acquires the first video data in which at least one of the luminance, the contrast, the colorfulness, and the color tone is corrected. The CPU 12 does not have to correct at least one of the luminance, the contrast, the colorfulness, and the color tone for the first video data. Thereby, the processing amount of the CPU 12 can be reduced.

(5) SUMMARY

The present embodiment is summarized.
The first aspect of the present embodiment is
an information processing apparatus (for example, client terminal 10) including:
a recognition module (S101) configured to recognize a first moving image and a second moving image in a first video data acquired by a camera (15), the first moving image including at least a part of a user's face, the second moving image not including a face;
a correction module (S1020) configured to correct the luminance of a first video data;
a correction module (S1023*c*) configured to correct a recognized second moving image;
a generation module (S102) configured to generate a second video data including a first moving image included in a first video data whose luminance is corrected and a corrected second moving image; and
a providing module (S103) configured to provide a second video data to a video call application (121).

The second aspect of the present embodiment is
an information processing apparatus (for example, client terminal 10) including:
a recognition module (S101) configured to recognize a first moving image and a second moving image in a first video data acquired by a camera (15), the first moving image including at least a part of a user's face, the second moving image not including a face;
a correction module (S1020) configured to correct the luminance of a recognized first moving image;
a correction module (S1023*c*) configured to correct a recognized second moving image;
a generation module (S102) configured to generate a second video data including a corrected first moving image and a corrected second moving image; and
a providing module (S103) configured to provide a second video data to a video call application.

According to these aspects, a user can easily process a moving image including his/her face used in a video call. This makes it possible to promote a utilization of a moving image in a video call.

In another aspect, a correction module (S1020) configured to correct a luminance may correct the luminance of a recognized first moving image so that the luminance is included in a predetermined range.

According to this aspect, a user can easily change an impression of an image of his/her face used in a video call.

In another aspect, a correction module (S1023*c*) configured to correct a second moving image may correct a second moving image in at least one of the following cases: (i) a case where an instruction of a user is received, (ii) a case where the ratio of a second moving image in a first video data is equal to or more than a predetermined threshold, and (iii) a case where a recognition of a first moving image is failed.

In another aspect, a correction module (S1023*c*) configured to correct a second moving image may correct a second moving image so that the visibility of a second moving image is lowered.

According to these aspects, a user can automatically prevent an image of a background (for example, a furniture arranged in a room) from being viewed by an opposite party user.

According to another aspect, an information processing apparatus may include a selection module (S1021) configured to select one of a plurality of makeup patterns,
an information processing apparatus may include a correction module (S1021) configured to correct a first moving image using a selected makeup pattern, and
a generation module (S102) configured to generate a second video data may generate a second video data including a corrected first moving image and a corrected second moving image.

In another aspect, a selection module (S1021) may select a makeup pattern specified by a user or a makeup pattern corresponding to user information (for example, a profile) about a user.

According to these aspects, a user can apply a desired makeup to an image of his/her face used in a video call.

The third aspect of the present embodiment is
an information processing apparatus including:
a recognition module (S101) configured to recognize a first moving image and a second moving image in a first video data acquired by a camera (15), the first moving image including at least a part of a user's face, the second moving image not including a face;
a selection module (S1021) configured to select one of a plurality of makeup patterns;
a correction module (S1021) configured to correct a recognized first moving image using a selected makeup pattern;
a generation module (S102) configured to generate a second video data including a corrected first moving image and a recognized second moving image; and
a providing module (S103) configured to provide a second video data to a video call application.

According to this aspect, a user can easily process a moving image including his/her face used in a video call. This makes it possible to promote a utilization of a moving image in a video call.

In another aspect, an information processing apparatus may include a changing module (S1023) configured to change a correction parameter of each correction module according to an instruction of a user.

According to this aspect, a user can obtain a moving image to which a desired makeup is performed.

In another aspect, an information processing apparatus may further include a storing module (S1023) configured to store a changed correction parameter in a memory (30) in association with a user ID for identifying a user.

According to this aspect, a user can use a makeup pattern customized by another user.

In another aspect, if a recognition of a first moving image is failed, a providing module (S103) configured to provide a second video data may (i) stop providing a second video data or (ii) provide a second video data generated when a recognition of a first moving image is succeeded.

According to this aspect, when a recognition of a face image is failed, it is possible to prevent an image of a face to which makeup is not performed from being provided to an opposite party user.

(6) Other Variations

The storage device 11 may be connected to the client terminal 10 via the network NW.

Although the embodiments of the present invention are described in detail above, the scope of the present invention is not limited to the above embodiments. Further, various modifications and changes can be made to the above embodiments without departing from the spirit of the present invention. In addition, the above embodiments and variations can be combined.

REFERENCE SIGNS LIST

1: Information processing system
10: Client terminal
11: Memory
12: CPU
13: Input and output interface
14: Communication interface
15: Camera
16: Microphone
30: Server
120: Virtual camera application
121: Video call application

The invention claimed is:

1. An information processing apparatus, comprising:
a selection module configured to select one of a plurality of makeup patterns;
a recognition module configured to recognize a first moving image and a second moving image in a first video data acquired by a camera, the first moving image including at least a part of a user's face, the second moving image not including the user's face and the second moving image including a background image;
a correction module configured to correct the luminance of the first moving image in the first video data to be in a predetermined range using the selected makeup pattern;
a correction module configured to correct the recognized second moving image in a case where the recognition of the first moving image is failed;
a generation module configured to generate a second video data including the first moving image included in the first video data whose luminance is corrected and the corrected second moving image in the case where the recognition of the first moving image is failed; and
a providing module configured to provide the second video data to a video call application,
wherein the recognition module recognizes the part of the user's face included in the first moving image based on a feature amount of the first video data,
wherein the correction module configured to correct the recognized second moving image corrects the second moving image so that the visibility of the second moving image is lowered,
wherein the generation module generates the second video data including the corrected first moving image and the corrected second moving image,
wherein the second video data includes the corrected first moving image in which the selected makeup pattern is applied to the parts of the user's face,
wherein the correction module:
(a) corrects the second moving image according to a ratio of the second moving image to the first moving image being equal to or more than a first predetermined value or (b) corrects the second moving image according to a recognition rate of the first moving image being equal to or less than a second predetermined value, and
wherein, when the background image is more than a predetermined size, the correction module corrects the background image according to a ratio of the background image to the first moving image.

2. The information processing apparatus according to claim 1, wherein the correction module configured to correct the luminance corrects the luminance of the recognized first moving image so that the luminance is included in a predetermined range.

3. The information processing apparatus according to claim 1, further comprising a changing module configured to change a correction parameter of each correction module according to an instruction of the user.

4. The information processing apparatus according to claim 3, further comprising a storing module configured to store the changed correction parameter in a memory in association with a user ID for identifying the user.

5. The information processing apparatus according to claim 1, wherein if the recognition of the first moving image is failed, the providing module configured to provide the second video data provides the second video data generated when the recognition of the first moving image is succeeded.

6. The information processing apparatus according to claim 1, wherein the part of the face included in the first moving image includes one or more of a lip, an eyelid, an eye, a cheek, a nose, a hairstyle, a facial contour, an eyebrow, and an eyelash.

7. An information processing apparatus, comprising:
a selection module configured to select one of a plurality of makeup patterns;
a recognition module configured to recognize a first moving image and a second moving image in a first video data acquired by a camera, the first moving image including at least a part of a user's face, the second moving image not including the user's face and the second moving image including a background image;
a correction module configured to correct the luminance of the recognized first moving image using the selected makeup pattern;
a correction module configured to correct the recognized second moving image in a case where the recognition of the first moving image is failed;
a generation module configured to generate a second video data including the corrected first moving image and the corrected second moving image; and
a providing module configured to provide the second video data to a video call application,
wherein the correction module configured to correct the second moving image corrects the second moving image so visibility of the second moving image is lowered,
wherein the generation module generates the second video data including the corrected first moving image and the corrected second moving image,
wherein the correction module:

(a) corrects the second moving image according to a ratio of the second moving image to the first moving image being equal to or more than a first predetermined value or (b) corrects the second moving image according to a recognition rate of the first moving image being equal to or less than a second predetermined value, and wherein, when the background image is more than a predetermined size, the correction module corrects the background image according to a ratio of the background image to the first moving image.

8. The information processing apparatus according to claim 7, wherein the correction module configured to correct the luminance corrects the luminance of the recognized first moving image so that the luminance is included in a predetermined range.

9. The information processing apparatus according to claim 7, wherein the selection module selects a makeup pattern specified by the user or a makeup pattern corresponding to user information about the user.

10. The information processing apparatus according to claim 7, further comprising a changing module configured to change a correction parameter of each correction module according to an instruction of the user.

11. The information processing apparatus according to claim 10, further comprising a storing module configured to store the changed correction parameter in a memory in association with a user ID for identifying the user.

12. The information processing apparatus according to claim 7, wherein, if the recognition of the first moving image is failed, the providing module that is configured to provide the second video data is further configured to provide the second video data generated when the recognition of the first moving image is succeeded.

* * * * *